United States Patent
Li et al.

(10) Patent No.: US 12,408,165 B2
(45) Date of Patent: Sep. 2, 2025

(54) TRANSMITTER, RECEIVER AND COMMUNICATION METHOD FOR IMPROVING UPLINK TRANSMISSION WITH CONFIGURED GRANT

(71) Applicant: JRD COMMUNICATION (SHENZHEN) LTD., Guangdong (CN)

(72) Inventors: Tian Li, Guangdong (CN); Jia Sheng, Guangdong (CN)

(73) Assignee: JRD COMMUNICATION (SHENZHEN) LTD., Guangdong (CN)

(*) Notice: Subject to any disclaimer, the term of this patent is extended or adjusted under 35 U.S.C. 154(b) by 386 days.

(21) Appl. No.: 18/005,858

(22) PCT Filed: Aug. 7, 2020

(86) PCT No.: PCT/CN2020/107942
§ 371 (c)(1),
(2) Date: Jan. 18, 2023

(87) PCT Pub. No.: WO2022/027640
PCT Pub. Date: Feb. 10, 2022

(65) Prior Publication Data
US 2023/0292310 A1 Sep. 14, 2023

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
CPC .......................... H04W 72/23; H04W 72/1268
(Continued)

(56) References Cited

U.S. PATENT DOCUMENTS

| | | | |
|---|---|---|---|
| 2021/0105176 A1* | 4/2021 | Tsai | H04L 41/0668 |
| 2021/0184812 A1* | 6/2021 | MolavianJazi | H04L 1/0045 |
| 2023/0125953 A1* | 4/2023 | Hurd | H04L 5/0053 370/329 |

FOREIGN PATENT DOCUMENTS

| | | |
|---|---|---|
| CN | 110536394 A | 12/2019 |
| CN | 110536463 A | 12/2019 |

(Continued)

OTHER PUBLICATIONS

International Search Report in International application No. PCT/CN2020/107942, mailed on Mar. 30, 2021.
(Continued)

*Primary Examiner* — Peter G Solinsky
(74) *Attorney, Agent, or Firm* — PV IP PC; Wei Te Chung

(57) ABSTRACT

Disclosed are a transmitter, a receiver and a communication method for improving uplink transmission in a communication system with configured grant, particularly in multiple transmission-reception point (multi-TRP)/panel scenario. The transmitter includes a circuitry configured to: receive a configured grant (CG) configuration used to configure a type of CG for a PUSCH transmission; and transmit the PUSCH transmission with the CG, wherein the CG PUSCH transmission is associated with one of the multi-TRPs for an active uplink Bandwidth Part (BWP) of a serving cell. The support for CG PUSCH transmission in multi-TRP/panel scenario is greatly enhanced.

17 Claims, 6 Drawing Sheets

(58) Field of Classification Search
USPC .......................................................... 370/329
See application file for complete search history.

(56) References Cited

FOREIGN PATENT DOCUMENTS

| | | | | |
|---|---|---|---|---|
| CN | 111108795 A | 5/2020 | | |
| CN | 111435920 A | 7/2020 | | |
| EP | 3809602 A1 | 4/2021 | | |
| EP | 3952484 A1 * | 2/2022 | ........... | H04L 5/0023 |
| WO | 2019142341 A1 | 7/2019 | | |
| WO | 2019244207 A1 | 12/2019 | | |

OTHER PUBLICATIONS

Written Opinion of the International Search Authority in International application No. PCT/CN2020/107942, mailed on Mar. 30, 2021.
European Search Report in European application No. 20948721.4, mailed on Mar. 19, 2024.
Chinese Office Action issued in corresponding Chinese Patent Application No. 202080104029.8 dated Feb. 28, 2025, pp. 1-14.

* cited by examiner

TRANSMITTER, RECEIVER AND COMMUNICATION METHOD FOR IMPROVING UPLINK TRANSMISSION WITH CONFIGURED GRANT

CROSS REFERENCE TO RELATED APPLICATION

This application claims the benefit of International Application No. PCT/CN2020/107942, filed on Aug. 7, 2020. The entire disclosure of the application is incorporated herein by reference.

TECHNICAL FIELD

The present disclosure relates to the field of wireless communication systems, and more particularly, to a transmitter, a receiver and a communication method for improving uplink transmission with configured grant, particularly in multiple transmission-reception point (multi-TRP)/panel scenario.

BACKGROUND ART

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards being a broadband and mobile system. In cellular wireless communication systems, user equipment (UE) is connected by a wireless link to a radio access network (RAN). The RAN includes a set of base stations (BSs) which provide wireless links to the UEs located in cells covered by the base station, and an interface to a core network (CN) which provides overall network control. The RAN and CN each conducts respective functions in relation to the overall network. The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a next generation Node B called gNodeB (gNB).

The 5G standard will support a multitude of different services each with very different requirements. These services include Enhanced Mobile Broadband (eMBB) for high data rate transmission, Ultra-Reliable Low Latency Communication (URLLC) for devices requiring low latency and high link reliability and Massive Machine-Type Communication (mMTC) to support a large number of low-power devices for a long life-time requiring highly energy efficient communication.

To maintain varying levels of quality of service (QoS) requirements demanded by this vast number of services, the 5G standard must allow a flexible and scalable design to support those various requirements at the same time.

In NR systems, the use of COntrol REsource SET (CORESET) has been agreed. This is a group of physical resource blocks (PRBs) for a certain number of Orthogonal Frequency Division Multiplexing (OFDM) symbols, to carry control information from the gNB to users. Contrary to LTE where there is a clear time split between control (Physical Downlink Control Channel (PDCCH) region) and data (Physical Downlink Shared Channel (PDSCH) region), in NR the control information will be sent to users through different CORESETs in the control region. Due to availability of very wide-bandwidth carriers in NR, CORESET may not occupy the whole control region all the time.

To exploit multiple path propagation, Multiple Input Multiple Output (MIMO) is a technique for multiplying the capacity of a radio link using multiple transmitting and receiving antennas. By deploying multiple antennas at the transmitter and the receiver, MIMO refers to a practical technique for sending and receiving more than one data signal simultaneously over a same radio channel (for large space) via multipath propagation, which improves the performance of spectral efficiency greatly.

A base station (BS) refers to a network central unit in the NR that is used to control one or multiple TRPs associated with one or multiple cells. ABS could be referred to as, eNB, NodeB, or gNodeB (also called gNB). A TRP is a transmission and reception point that provides network coverage and directly communicates with UEs, for example. A cell is composed of one or multiple associated TRPs, i.e. the coverage of the cell is a superset of the coverage of all the individual TRP(s) associated with the cell. One cell is controlled by one BS. A cell can also be referred to as a TRP group (TRPG).

Below a quick overview is given about what progress has been achieved to enable the use of multiple Transmission-Reception Point (multi-TRP/panel) transmission in an efficient manner.

Multi-TRP/Panel Transmission in Mimo

In 3GPP RAN1 #95 meeting, two different Downlink Control Information (DCI) designs have been agreed for supporting multi-TRP/panel transmission in NR:
  Scheme 1: Single NR-PDCCH schedules single NR-PDSCH where separate layers are transmitted from separate TRPs.
  Scheme 2: Multiple NR-PDCCHs each schedules a respective NR-PDSCH where each NR-PDSCH is transmitted from a separate TRP.

In the second technique shown in the FIG. 1, two NR-PDCCHs from separate TRPs schedule two corresponding NR-PDSCHs to a UE independently. The NR-PDCCHs may be scheduled independently from two TRPs. Therefore, this technique is beneficial especially when different TRPs are connected by non-ideal backhaul. In the multi-TRP/panel scenario, joint scheduling may not be feasible or extremely limited due to the large delay of information exchange, e.g. Channel State Information (CSI)/data/scheduling, among TRPs.

When independent resource allocation and other control information are needed at each TRP, multiple PDCCHs technique can also be useful. It is expected to improve the performance as fully independent scheduling and use of different Modulation and Coding Schemes (MCSs) for PDSCH is possible when each is scheduled by a separate DCI. Furthermore, it is possible to schedule different codewords at each TRP such that performance is improved.

Problem Formulation

In 3GPP Rel-16, single PDCCH and multiple PDCCHs based multiple TRP/panel transmission have been adopted for non-coherent joint transmission (NC-JT). In single PDCCH scenario, single PDCCH is considered to schedule single PDSCH from multi-TRPs. However, for the case of multiple PDCCHs, multiple PDCCHs each schedules a respective PDSCH where each PDSCH is transmitted from a separate TRP.

Physical Uplink Shared Channel (PUSCH) transmission can be dynamically scheduled by an UL grant (called dynamical grant, DG) in a DCI, or the transmission can correspond to a configured grant type 1 or type 2 (called configured grant, CG). The configured grant type 1 PUSCH transmission is semi-statically configured to operate upon the reception of higher layer parameter of configuredGrant-Config including rrc-ConfiguredUplinkGrant without the detection of an UL grant in a DCI. The configured grant type 2 PUSCH transmission is semi-persistently scheduled by an UL grant in a valid activation DCI after the reception of higher layer parameter configuredGrantConfig not including rrc-ConfiguredUplinkGrant. More than one configured grant configuration of configured grant type 1 and/or configured grant type 2 can be active at the same time in an active Bandwidth Part (BWP) of a serving cell.

In 3GPP Rel-16, the maximum number of CORESETs that can be configured with a same TRP is 3 and the maximum number of CORESETs that can be configured within a cell is 5. For downlink transmission, these CORESETs are divided into two groups and each group corresponds to a specific TRP. For downlink transmission, it has been agreed that a specific TRP can be identified by a higher layer index configured per CORESET (if configured). Then this index is further expressed as CORESETPoolIndex, which is contained in another higher layer parameter ControlResourceSet (CORESET). If a UE is configured with two different values of CORESETPoolIndex for the active bandwidth part (BWP) of a serving cell, the UE is expected to communicate with at most two different TRPs. It is obvious that if a PDSCH/PUSCH is dynamically scheduled by the corresponding DCI, the PDSCH/PUSCH can be identified by the CORESETPoolIndex, where the scheduling DCI is detected in the CORESET indicated by the CORESETPoolIndex. However, for uplink transmission with configured grant, there may be multiple TRPs in an active UL BWP. Hence, it is necessary to define the association between PUSCH with configured grant and TRP.

For PUSCH transmissions with dynamic grant, if a UE is configured with two different values of CORESETPoolIndex in a higher layer parameter ControlResourceSet for the active BWP of a serving cell, out-of-order scheduling for two non-overlapping dynamic grant PUSCHs is allowed, which are associated to different TRPs having different values of CORESETPoolIndex. With the introduction of configured grant PUSCH in multi-DCI based scenario, it is essential to design the scheduling order.

When a configured uplink grant is active, if the UE cannot find its Cell Radio Network Temporary Identifier (C-RNTI)/ Configured Scheduling RNTI (CS-RNTI) on the PDCCH, a CG PUSCH transmission can be transmitted. Otherwise, if the UE finds its C-RNTI/CS-RNTI on the PDCCH, the PDCCH allocation overrides the configured uplink grant. Then the processing time for the UE to check the overriding condition and validate the configured grant is further researched. For single TRP operation in 3GPP Rel-16, it is agreed to allow the prioritization of CG PUSCH transmission over DG PUSCH transmission under some conditions in case of collision. In detail, if the PDCCH containing the dynamic grant ends less than $N_2$ symbols before the start of a valid CG PUSCH transmission with a different HARQ process ID, the CG PUSCH transmission will not be cancelled. In multi-DCI based multi-TRP scenario, UE is expected to transmit multiple PUSCHs. With the introduction of CG PUSCH transmission, the processing time limit in the overriding condition should be defined.

Accordingly, there is a need to identify PUSCH with configured grant and solve other potential issues for uplink transmission with configured grant in multiple PDCCHs based multiple TRP/panel transmission.

RELATED ARTS

In 3GPP RAN1 #94b meeting, for single-TRP operation, it has been adopted that two dynamic grant PUSCHs cannot be overlapped in time. In other words, the two PUSCHs are scheduled in order or only allowed in in-order operation (as shown in case (c) in FIG. 2). The detailed agreement in the meeting is shown as follows:

Agreement:
  To adopt the following TP to Section 6.1 of 38.214
  Start of TP
  A UE shall upon detection of a PDCCH with a configured DCI format 0_0 or 0_1 transmit the corresponding PUSCH as indicated by that DCI. For any two HARQ process IDs in a given scheduled cell, if the UE is scheduled to start a first PUSCH transmission starting in symbol j by a PDCCH ending in symbol i, the UE is not expected to be scheduled to transmit a PUSCH starting earlier than the ending symbol of the first PUSCH by a PDCCH that does not end earlier than symbol i.

For multiple-PDCCH based multi-TRP in 3GPP Rel-16, out-of-order operation may be unavoidable across TRPs when backhaul is non-ideal; while within a TRP, in-order operation should be maintained in 3GPP Rel-15. In TS38.214 V16.0.0, the out-of-order operation (as shown in case (a) and case (b) in FIG. 2) across TRPs is adopted as below:

If a UE is configured by higher layer parameter PDCCH-Config that contains two different values of CORESETPoolIndex in ControlResourceSet for the active BWP of a serving cell and PDCCHs that schedule two non-overlapping in time domain PUSCHs are associated to different ControlResourceSets having different values CORESETPoolIndex, for any two HARQ process IDs in a given scheduled cell, if the UE is scheduled to start a first PUSCH transmission starting in symbol j by a PDCCH associated with a value of CORESETPoolIndex in symbol i, the UE can be scheduled to transmit a PUSCH starting earlier than the end of the first PUSCH by a PDCCH associated with a different value of CORESETPoolIndex that ends later than symbol i.

It is to be clarified here and in the context that the out-of-order operation includes the case (a) and (b) in FIG. 2; while in-order operation includes the case (c) in FIG. 2.

In 3GPP RAN1 #96 meeting, the prioritization between CG and DG was designed and the detailed conclusion and agreement are shown as follows:

Conclusion:
  It is recommended to support the handling of scenario 1 as listed in R1-1814342 in the 3GPP Rel-16 WI.
  It is recommended to allow the prioritization of configured grant over dynamic grant under some conditions in case of collision in scenario 2 as listed in R1-1814342 in the 3GPP Rel-16 WI.

Agreements:
  For scenario 2 as listed in R1-1814342, in case the collision between configured grant and dynamic grant occurs in physical layer, options to determine the prioritization between configured grant and dynamic grant include at least—to be further investigated during the WI phase:

Priority at PHY is determined by MAC layer for the purpose of PHY prioritization.

Note: this may or may not have any RAN1 impact

Priority at PHY is determined via using PHY channel(s)/signal(s)/parameters for the purpose of PHY prioritization.

It is configurable as part of the configured grant configuration whether it should have higher priority than dynamic grant in case of conflict.

Other options are not precluded.

In 3GPP RAN1 #99 meeting, the identification of PDSCH was designed and the detailed agreement is shown as follows:

Agreement:

If a UE is configured by higher layer parameter PDCCH-Config that contains two different values of CORESET-PoolIndex in ControlResourceSet for the active BWP of a serving cell, the UE may expect to receive multiple PDCCHs scheduling fully/partially/non-overlapped PDSCHs in time and frequency domain subject to UE capability Note: This allows a UE to be not configured with either joint HARQ ACK feedback or separate HARQ ACK feedback For the CORESET without CORESETPoolIndex, the UE may assume that the CORESET is assigned with CORESETPoolIndex as 0

Technical Problem

For uplink transmission with configured grant, there may be multiple TRPs in an active UL BWP. Hence, it is necessary to define the association between PUSCH with configured grant and TRP. With the introduction of configured grant PUSCH in multi-DCI based scenario, it is essential to design the scheduling order. With the introduction of CG PUSCH transmission, the processing time limit in the overriding condition should be defined.

Technical Solution

A first aspect of the present disclosure provides a transmitter, configured to communicate in a new radio (NR) communication system, the transmitter including: one or more interfaces configured to communicate with multiple transmission-reception points (multi-TRPs) within the NR communication system; and a circuitry configured to: receive a configured grant (CG) configuration used to configure a type of CG for a Physical Uplink Shared Channel (PUSCH) transmission; and transmit the PUSCH transmission with the CG, wherein the CG PUSCH transmission is associated with one of the multi-TRPs for an active uplink Bandwidth Part (BWP) of a serving cell.

A second aspect of the present disclosure provides a receiver, configured to communicate in a new radio (NR) communication system, the receiver including: one or more interfaces configured to communicate with multiple transmission-reception points (multi-TRPs) within the NR communication system; and a circuitry configured to: transmit a configured grant (CG) configuration used to configure a type of CG for a Physical Uplink Shared Channel (PUSCH) transmission; and receive the PUSCH transmission with the CG, wherein the CG PUSCH transmission is associated with one of the multi-TRPs for an active uplink Bandwidth Part (BWP) of a serving cell.

A third aspect of the present disclosure provides a communication method, applied to a transmitter in a new radio (NR) communication system, the method including: communicating with multiple transmission-reception points (multi-TRPs) within the NR communication system; receiving a configured grant (CG) configuration used to configure a type of CG for a Physical Uplink Shared Channel (PUSCH) transmission; and transmitting the PUSCH transmission with the CG, wherein the CG PUSCH transmission is associated with one of the multi-TRPs for an active uplink Bandwidth Part (BWP) of a serving cell.

A fourth aspect of the present disclosure provides a communication method, applied to a receiver in a new radio (NR) communication system, the method including: communicating with multiple transmission-reception points (multi-TRPs) within the NR communication system; transmitting a configured grant (CG) configuration used to configure a type of CG for a Physical Uplink Shared Channel (PUSCH) transmission; and receiving the PUSCH transmission with the CG, wherein the CG PUSCH transmission is associated with one of the multi-TRPs for an active uplink Bandwidth Part (BWP) of a serving cell.

The disclosed transmitter may be implemented by a UE and the disclosed receiver may be implemented by a base station such as gNodeB, or by a TRP, for example. In other circumstance, the transmitter/receiver may be implemented by a base station such as gNodeB, or by a TRP, for example.

The disclosed method may be implemented in user equipment, a base station or a TRP.

The disclosed method may be programmed as computer executable instructions stored in non-transitory computer readable medium. The non-transitory computer readable medium, when loaded to a computer, directs a processor of the computer to execute the disclosed method.

The non-transitory computer readable medium may include at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

The disclosed method may be programmed as computer program product, that causes a computer to execute the disclosed method.

Advantageous Effects

In the disclosure, the support for CG PUSCH transmission in multi-DCI based multi-TRP/panel scenario is greatly enhanced. The solutions include association between CG PUSCH and TRP, scheduling order among multiple PUSCHs, prioritization between CG PUSCH and dynamic grant (DG) PUSCH. Firstly, by defining several techniques to identify the association between CG PUSCH and TRP, the UE can start the CG PUSCH procedures. By relaxing the time limit, the scheduling order is defined when CG PUSCH is introduced in multi-TRP operation. Thirdly, regarding collision between the CG PUSCH and DG PUSCH, the issue of collision in different scenario is solved.

DESCRIPTION OF DRAWINGS

In order to more clearly illustrate the embodiments of the present disclosure or related art, the following figures that will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Figure 1:
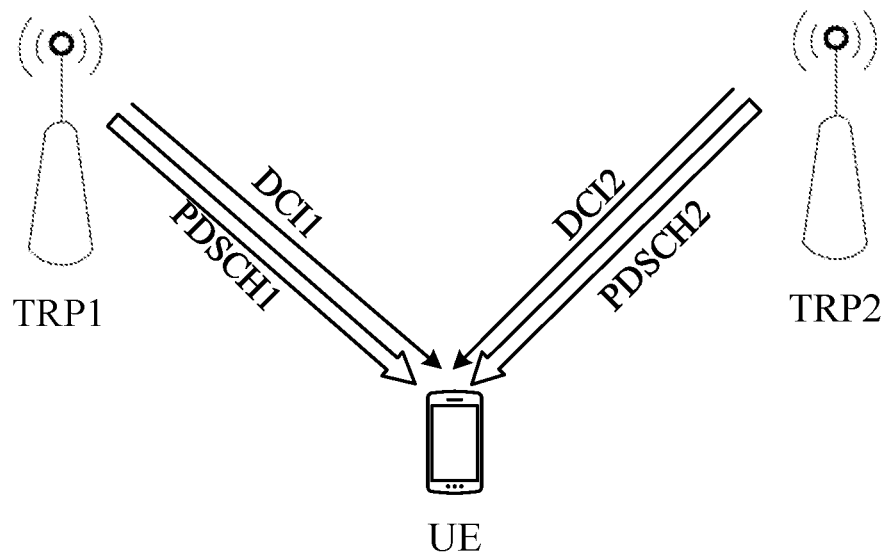
FIG. 1 is a schematic diagram illustrating multiple DCIs based multi-TRP/panel transmission.
Figure 2:
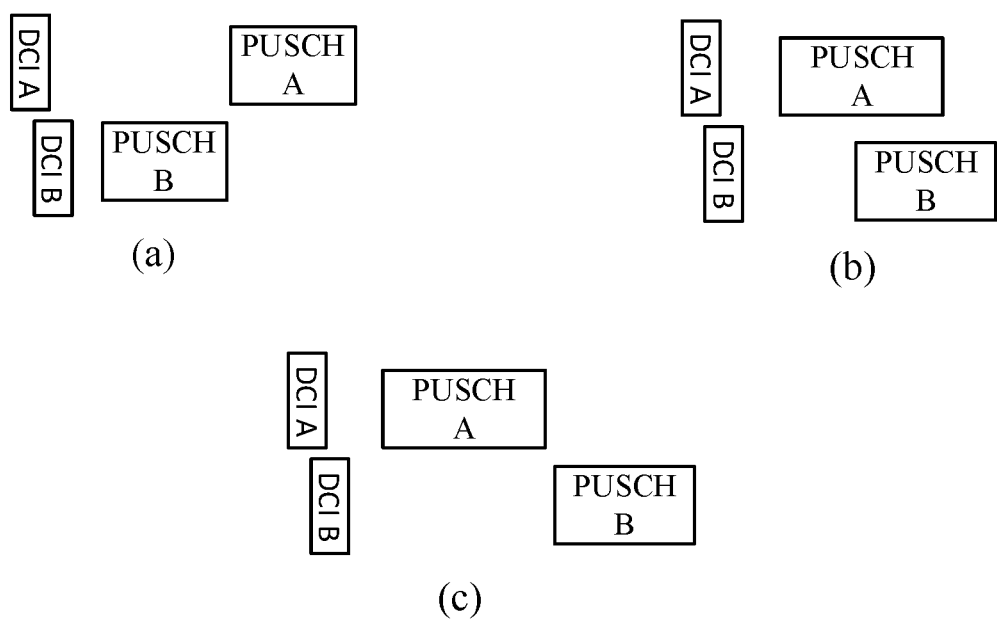
FIG. 2 is a schematic diagram illustrating examples for UL scheduling.

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

For easy of understanding, it is noted that in some circumstance, the term transmitter may be implemented by a UE and the term receiver may be implemented by a base station such as gNodeB, or by a TRP, for example; in other circumstance, the transmitter/receiver may be implemented by a base station such as gNodeB, or by a TRP, for example. However, this should not be taken as a limitation to interpretation of this invention.

In Problem Formulation, it was highlighted that when data is transmitted in multi-DCIs based multi-TRP/panel scenario, the transmitter and receiver have to identify the CG PUSCH prior to the transmission. The main idea of this disclosure is to provide a new design for multiple DCI based multiple TRP/panel transmission, through which the transmitter/receiver is allowed to support the uplink transmission with configured grant (CG).

In this disclosure, several solutions are proposed to support the CG PUSCH transmission, which include association between CG PUSCH and TRP, scheduling order among multiple PUSCHs, prioritization between CG PUSCH and dynamic grant (DG) PUSCH.

First of all, by defining several techniques to identify the association between CG PUSCH and TRP, the UE can start the CG PUSCH procedures. Secondly, by relaxing the time limit, several techniques are proposed to define the scheduling order when CG PUSCH is introduced in multi-TRP operation, including DG PUSCH transmitted with CG PUSCH and two CG PUSCHs. Thirdly, regarding collision between the CG PUSCH and DG PUSCH, several solutions are proposed to solve the issue of collision in different scenario. Taking these techniques into consideration, the support for CG PUSCH transmission in multi-DCI based multi-TRP/panel scenario is greatly enhanced.

Association Between CG Pusch and TRP

The high layer parameter ConfiguredGrantConfig is used to configure two types of configured grant PUSCH transmissions, i.e. configured grant type 1 and configured grant type 2. A dedicated configuration technique is designed for a specific type of configured grant. For the activation of CG, CG type 1 is configured via RRC and CG type 2 is configured via the DCI addressed to CS-RNTI.

In 3GGP Rel-16, a UE can be configured with at most two TRPs for an active UL BWP of a serving cell, hence it is essential to identify a PUSCH transmission with CG for a TRP before UL transmission. Based on the above description, several techniques are proposed in the disclosure to design the association between the PUSCH transmission with CG and TRP.

(1) CG Type 1

(i) Radio Resource Control (RRC) Configuration

After the reception of higher layer parameter of configuredGrantConfig including rrc-ConfiguredUplinkGrant, the CG type 1 PUSCH transmission is semi-statically configured. On receiving the configuration of CG type 1 from higher layer, UE starts the transmission without the detection of an UL grant in a DCI. By adding a TRP related parameter into the higher layer parameter of configuredGrantConfig, UE could determine which TRP to transmit the CG data to. Hence, the CG type 1 PUSCH transmission is associated with a dedicated TRP, which is indicated by the TRP related parameter, e.g. CORESET-PoolIndex.

Base on the above analysis, it is proposed in an embodiment of the present disclosure that by adding a TRP related parameter (e.g. CORESETPoolIndex) into the higher layer parameter of configuredGrantConfig, CG type 1 PUSCH transmission is associated with a dedicated TRP, which is indicated by this TRP related parameter.

(ii) Pre-Defined Rule

To simplify the association between CG type 1 and TRP, it is straightforward to associate the CG type 1 PUSCH transmission to a pre-defined TRP. By this way, if CG type 1 transmission is active, UE directly transmits uplink data to the pre-defined TRP without having to add higher layer parameter. Based on the above description, it is proposed in an embodiment of the present disclosure that CG type 1 PUSCH transmission is associated with a dedicated TRP, e.g. the value of CORESETPoolIndex is 0.

(2) CG Type 2

(i) RRC Configuration

Similarly, after receiving the configuration of CG type 2 from higher layer, UE starts the transmission with the detection of an UL grant in an activation DCI. By adding a TRP related parameter into the higher layer parameter of configuredGrantConfig, the CG type 2 PUSCH transmission is associated with a dedicated TRP, which is indicated by the TRP related parameter, e.g. CORESETPoolIndex.

Base on the above analysis, it is proposed in an embodiment of the present disclosure that by adding a TRP related parameter (e.g. CORESETPoolIndex) into the higher layer parameter of configuredGrantConfig, CG type 2 PUSCH transmission is associated with a dedicated TRP, which is indicated by this TRP related parameter.

(ii) CORESETPoolIndex

After the reception of higher layer parameter configuredGrantConfig not including rrc-ConfiguredUplinkGrant, the CG type 2 PUSCH transmission is semi-persistently scheduled by a DCI indicating configured uplink grant type 2 activation or deactivation.

The maximum number of CORESETs per BWP configured to a UE is five. These CORESETs can be divided into multiple groups and each group is associated to a dedicated TRP. A UE monitors PDCCH candidates in the UE specific search spaces sets whose time and frequency domain resource are indicated by the corresponding CORESET. With the successful detection of activation DCI, UE schedules a dedicated CG type 2 for a TRP. By this way, UE can identify a dedicated PUSCH transmission with CG type 2 for TRP.

Based on the relationship between CG type 2 and CORESET, it is proposed in an embodiment of the present disclosure that CG type 2 PUSCH transmission is associated with a TRP based on the value of CORESETPoolIndex in ControlResourceSet, where the valid activation DCI of CG type 2 is successfully detected. Specifically, if CORESETPoolIndex is not configured, the UE may assume that the value of CORESETPoolIndex is 0.

Scheduling Order Among Multiple PUSCHS

Based on the above description, each CG type 1/CG type 2 PUSCH transmission is associated with a dedicated TRP in multi-DCI based multi-TRP scenario. In 3 GPP Rel-16, when multi-DCI based multi-TRP scenario is deployed, out-of-order scheduling for two DG PUSCHs each from a different TRP is allowed. Due to the introduction of CG PUSCH transmission in multi-DCI based multi-TRP operation, out-of-order scheduling among multiple PUSCHs including CG PUSCH should be supported. To design the scheduling rule, four cases are proposed to be addressed.

(1) DG PUSCH and CG Type 1 PUSCH

If full scheduling information for transmitting a DG PUSCH is carried by the corresponding PDCCH, UE detects the DCI and scheduling offset $K_2$ for the DG PUSCH transmission is provided. During the scheduling of DG PUSCH, if a CG type 1 PUSCH transmission is semi-statically configured by higher layer parameters, the time domain parameters, the frequency domain parameters and the associated TRP applied for the transmission are provided. If the scheduling information of these two PUSCHs indicates that the DG PUSCH transmission will fully/partially/non-overlap with the CG type 1 PUSCH transmission in time and/or frequency domain, UE can schedule the CG type 1 PUSCH transmission starting earlier than the end of DG PUSCH transmission in multi-DCI based multi-TRP scenario.

Figure 3:
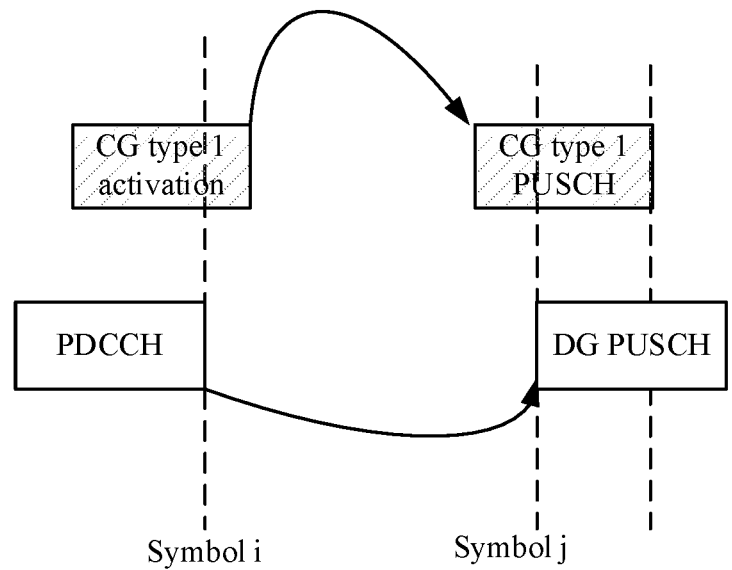
FIG. 3 is a schematic diagram illustrating out-of-order operation for DG and CG type 1 PUSCH transmission.

Based on the above analysis, it is proposed in an embodiment of the present disclosure that for multi-DCI based multi-TRP, when CG type 1 PUSCH transmission and DG PUSCH transmission are scheduled across TRPs, i.e. CG type 1 PUSCH transmission and DG PUSCH transmission are associated with different values of CORESETpoolIndex, the following operations is proposed:

Referring to FIG. 3, if the UE is scheduled to start a DG PUSCH transmission starting in symbol j by a PDCCH ending in symbol i, the UE can be scheduled to transmit a CG type 1 PUSCH transmission starting earlier than the end of the DG PUSCH transmission.

As shown in FIG. 3, an example of the scheduling order is described. Out-of-order for DG PUSCH transmission and CG type 1 PUSCH transmission is allowed. The CG type 1 PUSCH transmission is scheduled to start earlier than the end of the DG PUSCH transmission. The CG type 1 PUSCH transmission is allowed to fully/partially/non-overlap with the DG PUSCH transmission in multi-DCI based multi-TRP scenario.

(2) DG PUSCH and CG Type 2 PUSCH

If full scheduling information for transmitting a DG PUSCH is carried by the corresponding PDCCH, UE detects the DCI and scheduling offset $K_2$ for the DG PUSCH transmission is provided. During the scheduling of DG PUSCH, if UE receives an UL grant in a valid activation DCI that schedules the CG type 2 PUSCH transmission, the time domain parameters, the frequency domain parameters and the associated TRP applied for the transmission are provided. If the scheduling information of these two PUSCHs indicates that the DG PUSCH transmission will fully/partially/non-overlap with CG type 2 PUSCH transmission in time and/or frequency domain, UE can schedule the CG type 2 PUSCH transmission starting earlier than the end of DG PUSCH transmission in multi-DCI based multi-TRP scenario.

Figure 4:
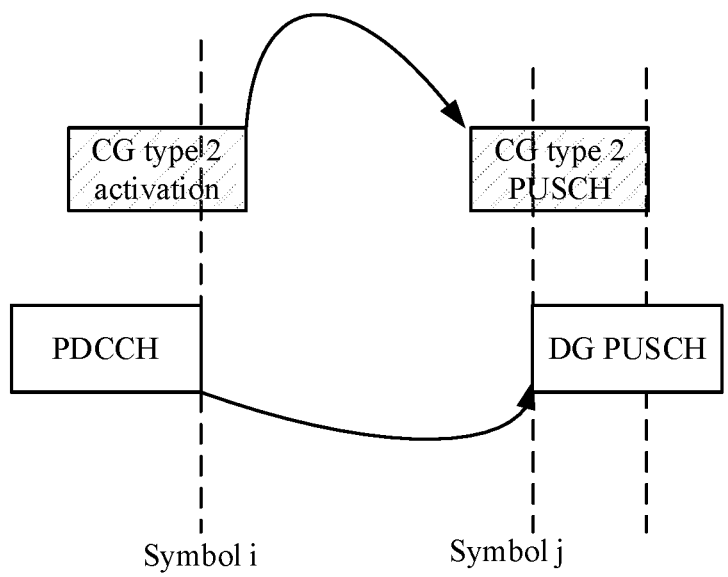
FIG. 4 is a schematic diagram illustrating out-of-order operation for DG and CG type 2 PUSCH transmission.

Based on the above analysis, it is proposed in an embodiment of the present disclosure that for multi-DCI based multi-TRP, when CG type 2 PUSCH transmission and DG PUSCH transmission are scheduled across TRPs, i.e. CG type 2 PUSCH transmission and DG PUSCH transmission are associated with different values of CORESETpoolIndex, the following operations is proposed:

Referring to FIG. 4, if the UE is scheduled to start a DG PUSCH transmission starting in symbol j by a PDCCH associated with a TRP identification (e.g. a value of CORESETpoolIndex) ending in symbol i, the UE can be scheduled to transmit a CG type 2 PUSCH transmission starting earlier than the end of the DG PUSCH transmission by a PDCCH associated with a different TRP identification (e.g. a different value of CORESETpoolIndex).

As shown in FIG. 4, an example of the scheduling order is described. Out-of-order for DG PUSCH transmission and CG type 2 PUSCH transmission is allowed. The CG type 2 PUSCH transmission is scheduled to start earlier than the end of the DG PUSCH transmission. The CG type 2 PUSCH transmission is allowed to fully/partially/non-overlap with the DG PUSCH transmission in multi-DCI based multi-TRP scenario.

(3) CG Type 1 PUSCH and CG Type 2 PUSCH

In 3GPP Rel-16, if a higher layer parameter of Configuredgrantconfig-ToAddModList-r16 is configured, more than one configured grant configuration of CG type 1 and/or CG type 2 may be active at the same time on an active BWP of a serving cell. It means that the CG type 1 PUSCH and CG type 2 PUSCH may be scheduled simultaneously in multi-DCI based multi-TRP operation.

When UE receives an activation DCI for CG type 2 PUSCH transmission, UE starts to schedule CG type 2 PUSCH. During the activation of CG type 2 PUSCH, the CG type 1 PUSCH is activated. If the scheduling information of these two PUSCHs indicates that the CG type 1 PUSCH transmission will fully/partially/non-overlaps with CG type 2 PUSCH transmission in time and/or frequency domain, UE can schedule the CG type 1 PUSCH transmission starting earlier than the end of CG type 2 PUSCH transmission in multi-DCI based multi-TRP scenario.

Figure 5:
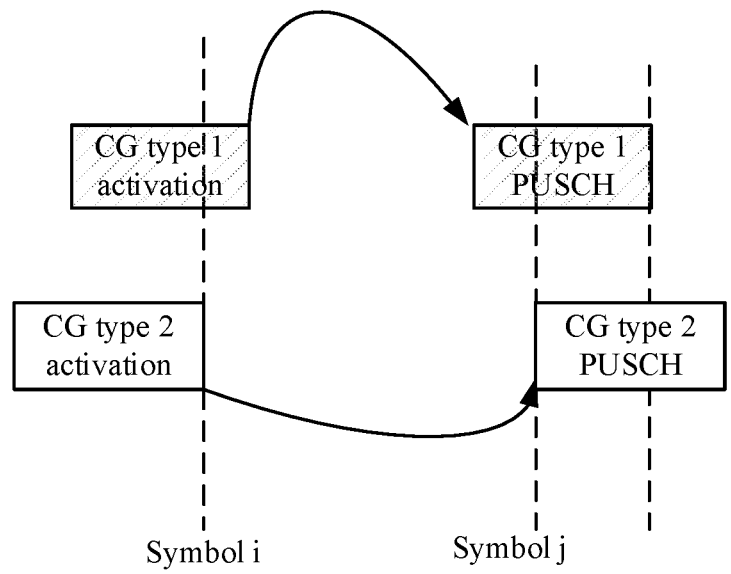
FIG. 5 is a schematic diagram illustrating out-of-order operation for CG type 1 and CG type 2 PUSCH transmission.

Based on the above analysis, it is proposed in an embodiment of the present disclosure that for multi-DCI based multi-TRP, when CG type 1 PUSCH transmission and CG type 2 PUSCH transmission are scheduled across TRPs, i.e. CG type 1 PUSCH transmission and CG type 2 PUSCH transmission are associated with different values of CORESETpoolIndex, the following operations is proposed:

Referring to FIG. 5, if the UE is scheduled to start a CG type 2 PUSCH transmission starting in symbol j by a PDCCH ending in symbol i, the UE can be scheduled to transmit a CG type 1 PUSCH transmission starting earlier than the end of the CG type 2 PUSCH transmission by higher layer signalling.

As shown in FIG. 5, an example of the scheduling order is described. Out-of-order for CG type 1 PUSCH transmission and CG type 2 PUSCH transmission is allowed. The CG type 1 PUSCH transmission is scheduled to start earlier than the end of the CG type 2 PUSCH transmission. The CG type 1 PUSCH transmission is allowed to fully/partially/non-overlap with the CG type 2 PUSCH transmission in multi-DCI based multi-TRP scenario.

(4) Two CG PUSCHs with the Same Type

As is mentioned in the above description, more than one configured grant configuration of CG type 1 and/or CG type 2 may be active at the same time. It means that the two CG PUSCHs with a same type (i.e. type 1 or type 2) may be scheduled simultaneously in multi-DCI based multi-TRP operation.

During the first activation of CG PUSCH (i.e. CG type 1 PUSCH or CG type 2 PUSCH) 1, the second CG PUSCH (i.e. CG type 1 PUSCH or CG type 2 PUSCH) 2 is activated. If the scheduling information of these two PUSCHs indicates that the CG PUSCH 2 will fully/partially/non-overlaps with CG PUSCH 1 in time and/or frequency domain, UE can schedule the CG PUSCH 2 transmission starting earlier than the end of CG PUSCH 1 transmission in multi-DCI based multi-TRP scenario.

(i) Two CG PUSCHs with Type 1

Based on the above analysis, it is proposed in an embodiment of the present disclosure that for multi-DCI based multi-TRP, when a CG type 1 PUSCH transmission and another CG type 1 PUSCH transmission are scheduled across TRPs, i.e. these two CG type 1 PUSCH transmissions are associated with different values of CORESETpoolIndex, the following operation is proposed:

If the UE is scheduled to start a CG type 1 PUSCH 1 transmission starting in symbol j by a higher layer signalling ending in symbol i, the UE can be scheduled to transmit CG type 1 PUSCH 2 transmission starting earlier than the end of CG type 1 PUSCH 1 transmission by another higher layer signalling that ends later than symbol i.

(ii) Two CG PUSCHs with Type 2

Figure 6:
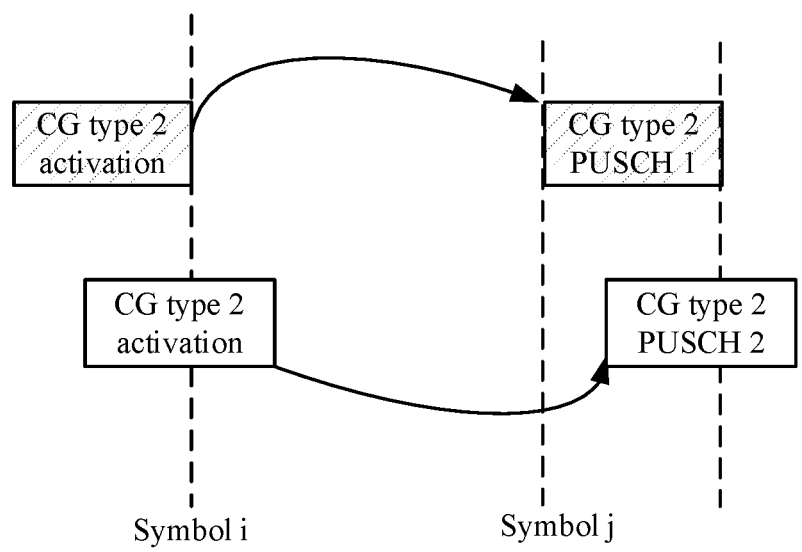
FIG. 6 is a schematic diagram illustrating out-of-order operation for two CG type 2 PUSCH transmissions.

Based on the above analysis, it is proposed in an embodiment of the present disclosure that for multi-DCI based multi-TRP, when a CG type 2 PUSCH transmission and another CG type 2 PUSCH transmission are scheduled across TRPs, i.e. these two CG type 2 PUSCH transmissions are associated with different values of CORESETpoolIndex, the following operation is proposed:

Referring to FIG. 6, if the UE is scheduled to start CG type 2 PUSCH 1 transmission starting in symbol j by a PDCCH associated with a value of CORESETpoolIndex ending in symbol i, the UE can be scheduled to transmit CG type 2 PUSCH 2 transmission starting earlier than the end of CG type 2 PUSCH 1 transmission by another PDCCH associated with a different value of CORESETpoolIndex that ends later than symbol i.

As shown in FIG. 6, an example of the scheduling order is described. Out-of-order for two CG type 2 PUSCH transmissions is allowed. The CG type 2 PUSCH 1 transmission is scheduled to start earlier than the end of the CG type 2 PUSCH 2 transmission. The CG type 2 PUSCH 1 transmission is allowed to fully/partially/non-overlap with the CG type 2 PUSCH 2 transmission in multi-DCI based multi-TRP scenario.

Prioritization Between CG and DG

For single TRP operation, if the PDCCH containing the DG PUSCH ends less than $N_2$ symbols before the start of a valid CG PUSCH transmission with a different HARQ process ID, the CG PUSCH transmission will not be cancelled. In multi-TRP scenario, UE is expected to transmit multiple fully/partially PUSCHs in time domain. With the introduction of CG PUSCH transmission in multi-TRP operation, the processing time limit in the overriding condition should be defined.

Considering that multiple configurations may be active at the same time, several techniques are proposed to cover the different overlapping conditions.

(1) A CG PUSCH Overlapping with Two DG PUSCHs

For the multi-TRP operation, there are two TRPs for an active UL BWP of a serving cell and each TRP is associated with a PUSCH transmission (e.g. DG PUSCH, CG type 1 PUSCH, CG type 2 PUSCH). If two dynamically scheduled PUSCH overlap with a CG PUSCH transmission (e.g. CG type 1 PUSCH, CG type 2 PUSCH), the prioritization between CG PUSCH and these DG PUSCHs should be defined. Two techniques are proposed to define the UE behavior based on whether the association between PUSCH and TRP is considered or not.

(i) The PUSCH Associated with the Same TRP

Two PDCCHs associated with different values of CORESETpoolIndex schedule two DG PUSCH transmissions. These two DG PUSCHs are associated with different TRPs according to the value of CORESETpoolIndex. Based on the above description, each CG PUSCH transmission is associated to a dedicated TRP. It means that one of the DG PUSCHs is associated with the same TRP as CG PUSCH. To simplify the UE behavior, it is proposed to consider only the DG PUSCH associated with the same TRP as CG PUSCH.

Based on the above analysis, it is proposed in an embodiment of the present disclosure that for multi-DCI based multi-TRP, when a CG PUSCH transmission overlaps with two DG PUSCHs, UE does not expect to transmit a DG PUSCH transmission by a PDCCH that ends less than $N_2$ symbols before the beginning of the CG PUSCH transmission and is associated with the same TRP (i.e. the value of CORESETpoolIndex) as CG PUSCH. The value $N_2$ in symbols is determined according to the UE processing capability defined in section 6.4 of 38.214 V16.1.0.

Figure 7:
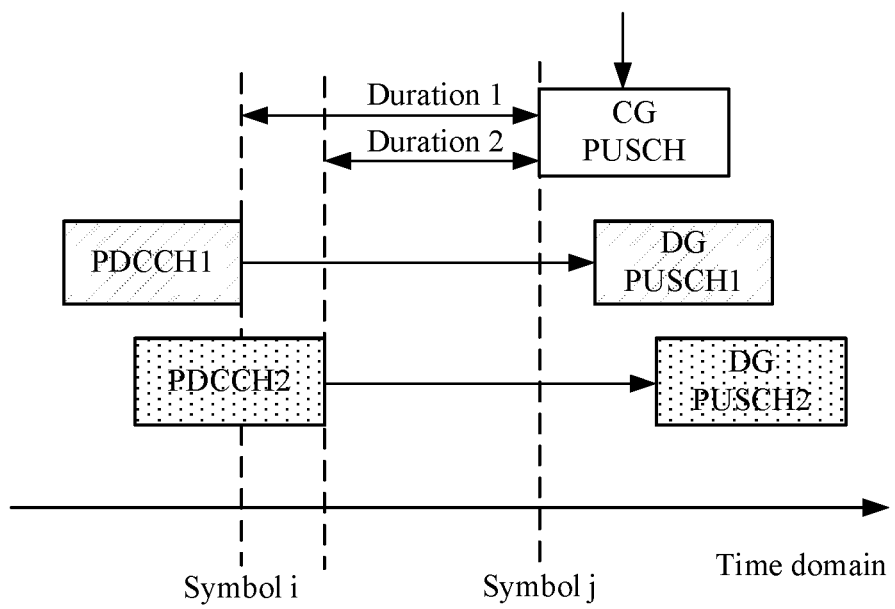
FIG. 7 is a schematic diagram illustrating a CG PUSCH transmission overlapping with two DG PUSCH transmissions.

As shown in FIG. 7, a CG PUSCH overlaps with two DG PUSCHs and PDCCH 1 is associated with the same TRP as the CG PUSCH. Regarding these two overlapping DG PUSCHs, UE considers only the DG PUSCH 1. The duration 1 is less than $N_2$ symbols, UE cancels the DG PUSCH 1 and transmits CG PUSCH.

(ii) The PDCCH with a Shorter Duration

When a CG PUSCH transmission overlaps with two DG PUSCHs in multi-DCI based multi-TRP scenario, every PDCCH scheduling a DG PUSCH has a dedicated duration from the end of the corresponding PDCCH to the beginning of the CG PUSCH transmission. The following prioritization are proposed:

If the shorter duration of these two durations is less than $N_2$ symbols, UE does not expect to transmit the DG PUSCH transmission by a PDCCH with a shorter duration.

If both of these durations are more than $N_2$ symbols, UE does not expect to transmit the CG PUSCH transmission As shown in FIG. 7, a CG PUSCH overlaps with two DG PUSCHs. Duration 2 is shorter than duration 1 and duration 2 is less than $N_2$ symbols. UE cancels the DG PUSCH 2 and transmits DG PUSCH 1 and CG PUSCH.

(2) A DG PUSCH Overlapping with Two CG PUSCHs

For the multi-TRP operation, if a dynamically scheduled PUSCH overlaps with two CG PUSCH transmissions, where each CG PUSCH transmission may be CG type 1 PUSCH or CG type 2 PUSCH, the prioritization between DG PUSCH and these CG PUSCHs should be defined. Two techniques are proposed to define the UE behavior based on whether the association between PUSCH and TRP is considered or not.

(i) The PUSCH Associated with the Same TRP

In this scenario, a DG PUSCH by a PDCCH is associated with a dedicated TRP according to the value of CORESETpoolIndex. Based on the above description, each CG PUSCH transmission is associated to a dedicated TRP. It means that one of the CG PUSCH is associated with a same TRP as DG PUSCH. To simplify the UE behavior, it is proposed to consider only the CG PUSCH associated with the same TRP as DG PUSCH.

Based on the above analysis, it is proposed in an embodiment of the present disclosure that for multi-DCI based multi-TRP, when a DG PUSCH overlaps with two CG PUSCH transmissions, UE does not expect to transmit a DG PUSCH transmission by a PDCCH which ends less than $N_2$ symbols before the beginning of the CG PUSCH transmission that is associated with the same TRP (i.e. the value of CORESETpoolIndex) as DG PUSCH. The value $N_2$ in symbols is determined according to the UE processing capability defined in section 6.4 of 38.214 V16.1.0.

Figure 8:
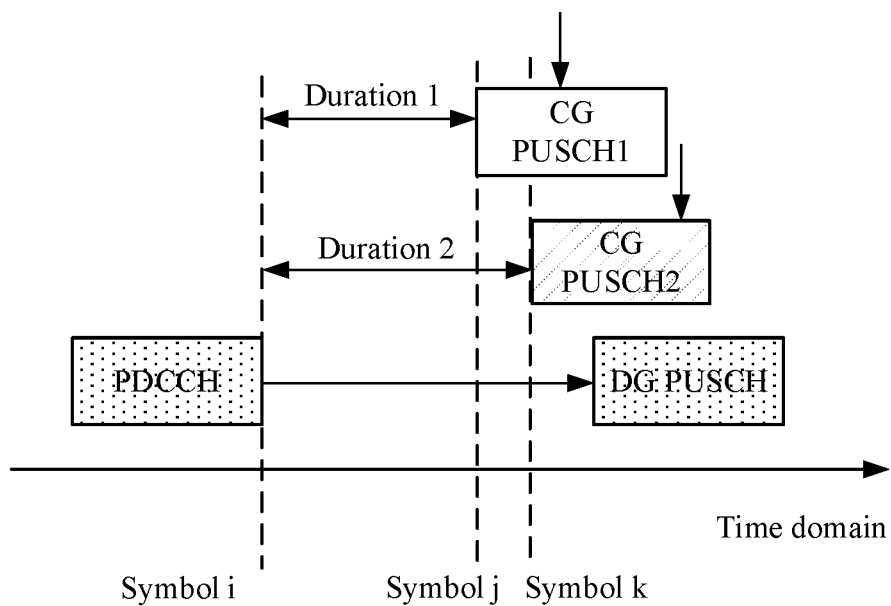
FIG. 8 is a schematic diagram illustrating a DG PUSCH transmission overlapping with two CG PUSCH transmissions.

As shown in FIG. 8, a DG PUSCH overlaps with two CG PUSCHs and CG PUSCH 1 is associated with the same TRP as the DG PUSCH. Regarding these two overlapping CG PUSCHs, UE considers only the CG PUSCH 1. The duration 1 is less than $N_2$ symbols. UE cancels the DG PUSCH and transmits CG PUSCH 1.

(ii) The CG PUSCH with a Longer Duration

When a DG PUSCH transmission overlaps with two CG PUSCHs in multi-DCI based multi-TRP scenario, every CG PUSCH has a dedicated duration from the end of the PDCCH scheduling the DG PUSCH to the beginning of the corresponding CG PUSCH. The following prioritizations are proposed:

If both of these durations are less than $N_2$ symbols, UE does not expect to transmit the DG PUSCH transmission by a PDCCH.

If one of these durations is more than $N_2$ symbols, UE does not expect to transmit the CG PUSCH transmission with a longer duration.

As shown in FIG. 8, a DG PUSCH overlaps with two CG PUSCHs. Both duration 1 and duration 2 are less than $N_2$ symbols, UE cancels the DG PUSCH and transmits these two CG PUSCHs.

(3) Two DG PUSCHs Overlapping with Two CG PUSCHs

For the multi-TRP operation, if two dynamically scheduled PUSCH overlaps with two CG PUSCH transmissions, where each CG PUSCH transmission may be CG type 1 PUSCH or CG type 2 PUSCH, the prioritization between these DG PUSCHs and these CG PUSCHs should be defined. Two techniques are proposed to define the UE behavior based on whether the association between PUSCH and TRP is considered or not.

(i) The PUSCH Pair Associated with the Same TRP

In this scenario, these two DG PUSCHs are associated with two TRPs according to the value of CORESETpoolIndex. Based on the above description, each CG PUSCH transmission is associated to a dedicated TRP. A CG PUSCH and DG PUSCH associated with a same TRP are regarded as a pair. To simplify the UE behavior, it is proposed to define the prioritization between the CG PUSCH and DG PUSCH associated with a same TRP.

When two DG PUSCH transmissions overlap with two CG PUSCHs in multi-DCI based multi-TRP scenario, a DG PUSCH and CG PUSCH associated with a same TRP are regarded as a pair. The following prioritizations are proposed:

For the first pair with a value of CORESETPoolIndex, UE does not expect to transmit the DG PUSCH transmission by a PDCCH which ends less than $N_2$ symbols before the beginning of the corresponding CG PUSCH transmission in this pair. The value $N_2$ in symbols is determined according to the UE processing capability defined in section 6.4 of 38.214 V16.1.0.

For the second pair with a different value of CORESETPoolIndex, UE does not expect to transmit the DG PUSCH transmission by a PDCCH which ends less than $N_2$ symbols before the beginning of the corresponding CG PUSCH transmission in this pair.

Figure 9:
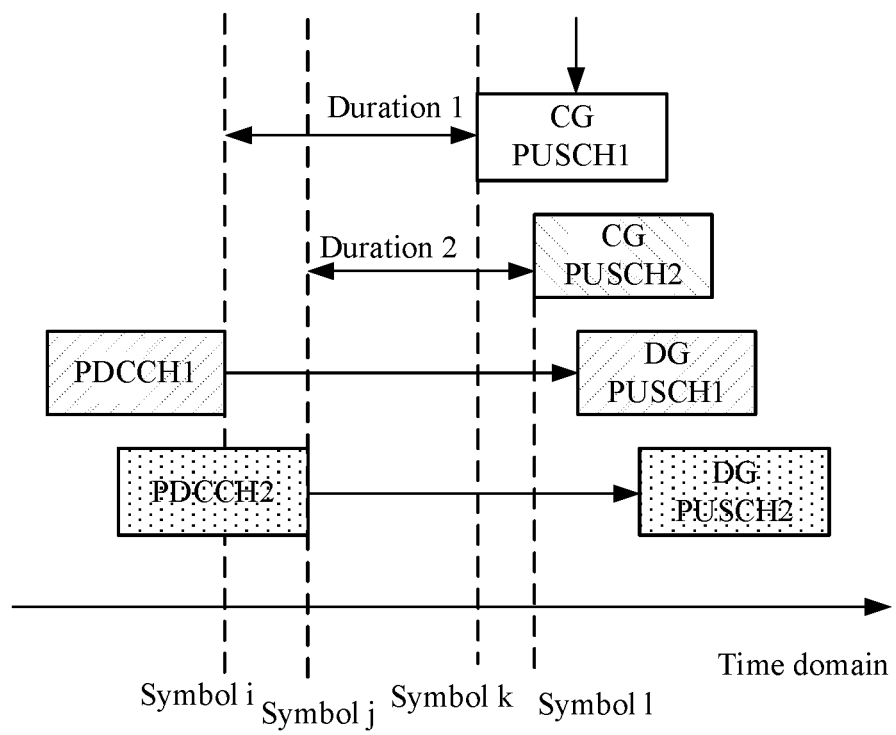
FIG. 9 is a schematic diagram illustrating two DG PUSCH transmissions overlapping with two CG PUSCH transmissions.

As shown in FIG. 9, DG PUSCH 1 and CG PUSCH 1 are regarded as the first pair. DG PUSCH 2 and CG PUSCH 2 are regarded as the second pair. Duration 1 and duration 2 are less than $N_2$ symbols, UE transmits CG PUSCH 1 and CG PUSCH 2.

(ii) The PUSCH Pair in Time Domain

When two DG PUSCH transmissions overlap with two CG PUSCHs in multi-DCI based multi-TRP scenario, the DG PUSCH by the PDCCH ending firstly and the CG PUSCH starting firstly are regarded as a pair, besides, the DG PUSCH by the PDCCH ending secondly and the CG PUSCH starting secondly are regarded as another pair. The following prioritizations are proposed:

For the first pair, UE does not expect to transmit the DG PUSCH transmission by a PDCCH which ends less than $N_2$ symbols before the beginning of the corresponding CG PUSCH transmission in this pair.

For the second pair, UE does not expect to transmit the DG PUSCH transmission by a PDCCH which ends less than $N_2$ symbols before the beginning of the corresponding CG PUSCH transmission in this pair.

Figure 10:
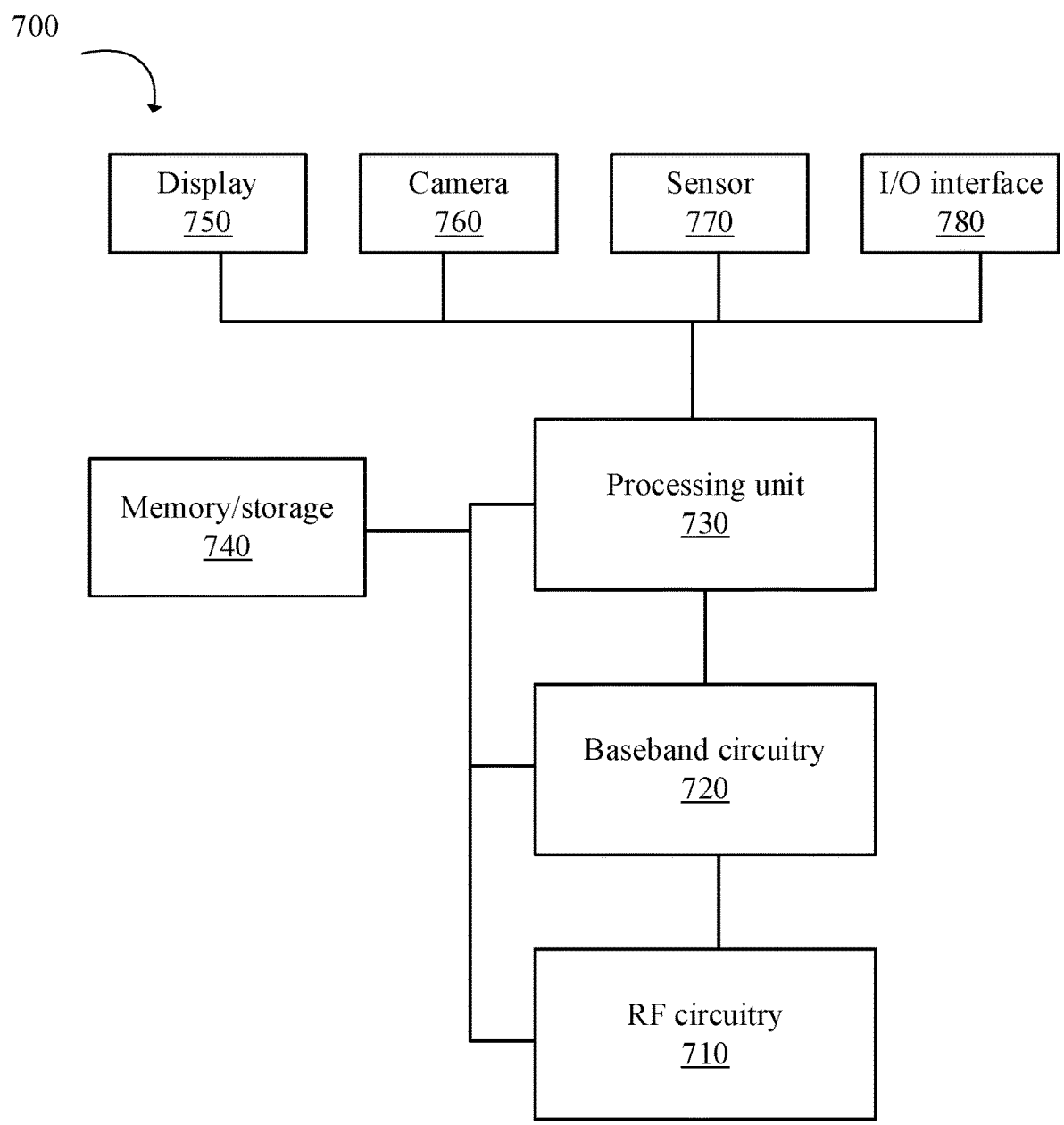
FIG. 10 is a block diagram of an example system for wireless communication according to an embodiment of the present disclosure.

FIG. 10 is a block diagram of an example system 700 for wireless communication according to an embodiment of the present disclosure. Embodiments described herein may be implemented into the system using any suitably configured hardware and/or software. FIG. 10 illustrates the system 700 including a radio frequency (RF) circuitry 710, a baseband circuitry 720, a processing unit 730, a memory/storage 740, a display 750, a camera 760, a sensor 770, and an input/output (I/O) interface 780, coupled with each other as illustrated.

The processing unit 730 may include a circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include a circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with 5G NR, LTE, an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the UE, eNB, gNB or TRP may be embodied in whole or in part in one or more of the RF circuitries, the baseband circuitry, and/or the processing unit. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the processing unit, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory. In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite. In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

The embodiment of the present disclosure is a combination of techniques/processes that can be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

The invention claimed is:

1. A transmitter, configured to communicate in a communication system, the transmitter comprising:
one or more interfaces configured to communicate with transmission-reception points (TRPs) within the communication system; and
a circuitry configured to:
receive a configured grant (CG) configuration used to configure a type of CG for a Physical Uplink Shared Channel (PUSCH) transmission;
transmit the PUSCH transmission with the CG, wherein the CG PUSCH transmission is implicitly or explicitly associated with one of the TRPs; and
receive scheduling information about the CG PUSCH transmission and another CG PUSCH transmission scheduled across the TRPs and associated with different TRP identifications, wherein the scheduling information indicates that activation of the CG PUSCH transmission ends later than an end of activation of the another CG PUSCH transmission, and the CG PUSCH transmission is allowed to start earlier than an end of the another CG PUSCH transmission.

2. The transmitter according to claim 1, wherein the CG configuration is received via Radio Resource Control (RRC).

3. The transmitter according to claim 1, wherein the circuitry is configured to:
in response to the CG configuration indicative of a CG type 1 PUSCH transmission, associate the CG type 1 PUSCH transmission with a TRP indicated by a TRP related parameter.

4. The transmitter according to claim 3, wherein the CG configuration comprises the TRP related parameter.

5. The transmitter according to claim 1, wherein the circuitry is configured to:
in response to the CG configuration indicative of a CG type 1 PUSCH transmission, associate the CG type 1 PUSCH transmission with a pre-defined TRP.

6. The transmitter according to claim 1, wherein the circuitry is configured to:
in response to the CG configuration indicative of a CG type 2 PUSCH transmission, associate the CG type 2 PUSCH transmission with a TRP indicated by a TRP related parameter.

7. The transmitter according to claim 1, wherein the circuitry is configured to:
associate a CG type 2 PUSCH transmission indicated by Downlink Control Information (DCI) that is configured in a COntrol REsource SET (CORESET) of a control region, with a TRP associated with the CORESET.

8. The transmitter according to claim 1, wherein the circuitry is configured to:
receive scheduling information about a dynamic grant (DG) PUSCH transmission and the CG PUSCH transmission scheduled across the TRPs, wherein the scheduling information indicates that activation of the CG PUSCH transmission ends later than an end of a Physical Downlink Control Channel (PDCCH) scheduling the DG PUSCH transmission, and the CG PUSCH transmission associated with a first TRP identification is allowed to start earlier than an end of the DG PUSCH transmission associated with a second TRP identification different from the first TRP identification.

9. The transmitter according to claim 8, wherein the CG PUSCH transmission is one of a CG type 1 PUSCH transmission and a CG type 2 PUSCH transmission.

10. The transmitter according to claim 8, wherein the DG PUSCH transmission is scheduled by the PDCCH associated with the first TRP identification and the CG PUSCH transmission is a CG type 2 PUSCH transmission scheduled by another PDCCH associated with the second TRP identification.

11. The transmitter according to claim 1, wherein the circuitry is configured to:
receive scheduling information about a CG type 1 PUSCH transmission and a CG type 2 PUSCH transmission scheduled across the TRPs, wherein the scheduling information indicates that activation of the CG type 1 PUSCH transmission ends later than an end of activation of the CG type 2 PUSCH transmission, and the CG type 1 PUSCH transmission associated with a first TRP identification is allowed to start earlier than an end of the CG type 2 PUSCH transmission associated with a second TRP identification different from the first TRP identification.

12. The transmitter according to claim 1, wherein the CG PUSCH transmission and the another CG PUSCH transmission are two PUSCH transmissions of one of CG type 1 and CG type 2.

13. The transmitter according to claim 1, wherein the CG PUSCH transmission and the another CG PUSCH transmission are CG type 2 PUSCH transmissions scheduled by two PDCCHs associated with two different TRP identifications, respectively.

14. The transmitter according to claim 1, wherein the circuitry is configured to:
in response to the CG PUSCH transmission overlapping with two DG PUSCH transmissions, transmit no DG PUSCH transmission scheduled by a PDCCH that ends less than a predetermined number of symbols before the beginning of the CG PUSCH transmission and is associated with a same TRP identification as the CG PUSCH transmission.

15. The transmitter according to claim 1, wherein the circuitry is configured to:
in response to the CG PUSCH transmission overlapping with two DG PUSCH transmissions, transmit the PUSCH transmissions based on the following rules:
if a shorter duration of a first duration and a second duration is less than a predetermined number of symbols, transmit no DG PUSCH transmission scheduled by a PDCCH with the shorter duration; and
if both the first duration and the second duration are more than the predetermined number of symbols, transmit no CG PUSCH transmission,
wherein the first duration is from an end of the PDCCH scheduling one of the two DG PUSCH transmissions to the beginning of the CG PUSCH transmission and the second duration is from an end of the PDCCH scheduling the other one of the two DG PUSCH transmissions to the beginning of the CG PUSCH transmission.

16. The transmitter according to claim 1, wherein the circuitry is configured to:
in response to a DG PUSCH transmission overlapping with two CG PUSCH transmissions, transmit no DG PUSCH transmission scheduled by a PDCCH that ends less than a predetermined number of symbols before the beginning of the CG PUSCH transmission that is associated with a same TRP identification as the DG PUSCH transmission.

17. The transmitter according to claim 1, wherein the circuitry is configured to:
in response to a DG PUSCH transmission overlapping with two CG PUSCH transmissions, transmit the PUSCH transmissions based on the following rules:
if both a first duration and a second duration are less than a predetermined number of symbols, transmit no DG PUSCH transmission; and
if one of the first duration and the second duration is more than the predetermined number of symbols, transmit no CG PUSCH transmission with a longer duration,
wherein the first duration is from an end of a PDCCH scheduling the DG PUSCH transmission to the beginning of one of the two CG PUSCH transmissions and the second duration is from the end of the PDCCH scheduling the DG PUSCH transmission to the beginning of the other one of the two CG PUSCH transmissions.

* * * * *